United States Patent
Watanabe et al.

(10) Patent No.: US 11,645,838 B2
(45) Date of Patent: May 9, 2023

(54) OBJECT DETECTION SYSTEM, OBJECT DETECTION METHOD, AND PROGRAM

(71) Applicant: Toyota Jidosha Kabushiki Kaisha, Toyota (JP)

(72) Inventors: Suguru Watanabe, Nagoya (JP); Hiroya Matsubayashi, Nisshin (JP); Daisaku Honda, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/410,440

(22) Filed: Aug. 24, 2021

(65) Prior Publication Data
US 2022/0067367 A1 Mar. 3, 2022

(30) Foreign Application Priority Data
Aug. 26, 2020 (JP) .............................. JP2020-142257

(51) Int. Cl.
*G06V 20/00* (2022.01)
*G06T 7/246* (2017.01)
*G06V 10/25* (2022.01)

(52) U.S. Cl.
CPC .............. *G06V 20/00* (2022.01); *G06T 7/248* (2017.01); *G06V 10/25* (2022.01)

(58) Field of Classification Search
CPC ......... G06V 20/00; G06V 10/25; G06T 7/248
See application file for complete search history.

(56) References Cited

U.S. PATENT DOCUMENTS

| | | | | |
|---|---|---|---|---|
| 2010/0110183 | A1* | 5/2010 | Bobbitt | G06V 10/25 |
| | | | | 382/103 |
| 2014/0161312 | A1* | 6/2014 | Adachi | G06V 40/10 |
| | | | | 382/103 |
| 2015/0077568 | A1* | 3/2015 | Tsunematsu | G08B 13/19645 |
| | | | | 348/159 |
| 2018/0308243 | A1* | 10/2018 | Justice | G06V 10/25 |
| 2021/0304291 | A1* | 9/2021 | Aggarwal | G06Q 30/0639 |

FOREIGN PATENT DOCUMENTS

JP 2019-165501 A 9/2019

* cited by examiner

*Primary Examiner* — Pinalben Patel
(74) *Attorney, Agent, or Firm* — Dinsmore & Shohl LLP

(57) ABSTRACT

An object detection system capable of tracking a moving object over a wide range, at a high processing speed, and with a high accuracy of recognition without increasing the number of image capturing apparatuses installed in one place is provided. A movement information acquisition unit acquires movement information, which is information regarding a moving object included in a first image captured by a first image capturing apparatus among a plurality of image capturing apparatuses arranged in positions different from one another. A search range determination unit determines a limited search range in a second image captured by a second image capturing apparatus among the plurality of image capturing apparatuses in accordance with the movement information. An object recognition unit performs recognition of the moving object for the search range in the second image.

7 Claims, 11 Drawing Sheets

OBJECT
INFORMATION

| OBJECT ID |
| --- |
| TYPE |
| RELIABILITY |
| RECOGNITION TIME |
| RECOGNITION LATITUDE |
| RECOGNITION LONGITUDE |
| RECOGNITION ORIENTATION |
| RECOGNITION SPEED |
| TYPE OF VEHICLE |
| COLOR OF VEHICLE BODY |
| VEHICLE BODY NUMBER |
| FEATURE AMOUNT |
| ... |

Fig. 4

OBJECT DETECTION SYSTEM, OBJECT DETECTION METHOD, AND PROGRAM

CROSS REFERENCE TO RELATED APPLICATIONS

This application is based upon and claims the benefit of priority from Japanese patent application No. 2020-142257, filed on Aug. 26, 2020, the disclosure of which is incorporated herein in its entirety by reference.

BACKGROUND

The present disclosure relates to an object detection system, an object detection method, and a program, and in particular, to an object detection system, an object detection method, and a program for detecting a moving object.

There have been techniques for detecting objects using an image capturing apparatus such as a camera. With regard to these techniques, Japanese Unexamined Patent Application Publication No. 2019-165501 discloses a tracking system that tracks one target object by a plurality of cameras. The tracking system disclosed in Japanese Unexamined Patent Application Publication No. 2019-165501 includes a first camera that captures a first video image, a second camera that captures a second video image at an angle of view substantially the same as that of the first camera, and a processor. The processor performs first tracking processing for tracking a target object on the first video image and second tracking processing for tracking a target object on the second video image. Further, the processor performs reliability calculation processing for calculating a first reliability, which is a reliability, of the target object, obtained by the first tracking processing, and a second reliability, which is a reliability, of the target object, obtained by the second tracking processing. Further, the processor compares the first reliability with the second reliability, specifies the tracking processing whose reliability is higher than that of the other tracking processing, and performs control processing for controlling, based on the result of the tracking processing that has been specified, the other tracking processing.

SUMMARY

According to the technique disclosed in Japanese Unexamined Patent Application Publication No. 2019-165501, a plurality of cameras (the first camera and the second camera) capture images with substantially the same angle of view. According to techniques of this kind, it is impossible to track one target object for positions different from one another. Therefore, it is difficult to track a moving object over a wide range. Further, while the aim of the technique disclosed in Japanese Unexamined Patent Application Publication No. 2019-165501 is to improve the accuracy of the tracking by using a plurality of cameras in one place, it is possible that a plurality of cameras cannot be installed in one place. In this case, it is difficult to improve the speed of the object recognition processing without reducing the accuracy of the recognition of the object.

The present disclosure provides an object detection system, an object detection method, and a program capable of tracking a moving object over a wide range, at a high processing speed, and with a high accuracy of recognition without increasing the number of image capturing apparatuses installed in one place.

An object detection system according to the present disclosure includes: a movement information acquisition unit configured to acquire movement information, which is information regarding a moving object included in a first image captured by a first image capturing apparatus among a plurality of image capturing apparatuses arranged in positions different from one another; a search range determination unit configured to determine a limited search range in a second image captured by a second image capturing apparatus among the plurality of image capturing apparatuses in accordance with the movement information; and an object recognition unit configured to perform recognition of the moving object for the limited search range in the second image.

Further, the object detection system according to the present disclosure may further include the plurality of image capturing apparatuses.

Further, an object detection method according to the present disclosure includes: acquiring movement information, which is information regarding a moving object included in a first image captured by a first image capturing apparatus among a plurality of image capturing apparatuses arranged in positions different from one another; determining a limited search range in a second image captured by a second image capturing apparatus among the plurality of image capturing apparatuses in accordance with the movement information; and performing recognition of the moving object for the limited search range in the second image.

Further, a program according to the present disclosure causes a computer to execute: acquiring movement information, which is information regarding a moving object included in a first image captured by a first image capturing apparatus among a plurality of image capturing apparatuses arranged in positions different from one another; determining a limited search range in a second image captured by a second image capturing apparatus among the plurality of image capturing apparatuses in accordance with the movement information; and performing recognition of the moving object for the limited search range in the second image.

In the present disclosure, according to this configuration, a moving object is detected only in a range where the moving object is highly likely to appear. Therefore, the detection speed becomes higher and the accuracy of the detection becomes higher than those in the case in which a whole image is searched. Further, since the plurality of image capturing apparatuses are installed at positions different from one another, a moving object can be detected over a wide range. Therefore, the object detection system according to the present disclosure enables a moving object to be tracked over a wide range, at a high processing speed, and with a high accuracy of recognition without increasing the number of image capturing apparatuses installed in one place.

The search range determination unit may further determine the limited search range when the movement information indicates that the moving object is traveling toward an imaging region of the second image capturing apparatus.

According to the above configuration, the search range may be limited when the moving object appears in the imaging region of the second image capturing apparatus. Therefore, it is possible to detect a moving object more definitely in a determined limited search range.

The search range determination unit may further determine a predetermined range in the second image that corresponds to a direction of an imaging region of the first image capturing apparatus to be the limited search range.

According to the above configuration, a region where it is highly likely that the moving object will appear in an angle of view of the image capturing apparatus is determined to be a limited search range. Therefore, it is possible to determine the search range more appropriately.

The object recognition unit may further perform recognition of the moving object for the limited search range at a timing when the moving object is estimated to reach an imaging region of the second image capturing apparatus.

According to the above configuration, the search range is limited at a timing when the moving object is estimated to reach the imaging region of the second image capturing apparatus. It is therefore possible to detect a moving object more definitely.

The object detection system may further include a reliability calculation unit configured to calculate, for each type of the moving object, a reliability of recognition of the moving object using the type and the reliability of the moving object obtained as a result of object recognition performed by the object recognition unit and the type and the reliability of the moving object included in the movement information.

In this way, the amount of data regarding the reliability calculated using the plurality of pieces of object information is larger than that regarding the reliability obtained in object recognition processing performed by the object recognition unit. Therefore, the accuracy of the reliability calculated using the plurality of pieces of object information becomes higher than that of the reliability obtained in object recognition processing performed by the object recognition unit. Therefore, with the above configuration, it becomes possible to improve the accuracy of the reliability.

The reliability calculation unit may further calculate, for each type of the moving object, a reliability by calculating an average of the reliability of the moving object obtained as a result of object recognition performed by the object recognition unit and the reliability of the moving object included in the movement information.

According to the above configuration, for each determined type of the moving object, a reliability in which a plurality of reliabilities are taken into account is calculated. Therefore, it is possible to calculate a reliability more appropriately.

According to the present disclosure, it is possible to provide an object detection system, an object detection method, and a program capable of tracking a moving object over a wide range, at a high processing speed, and with a high accuracy of recognition without increasing the number of image capturing apparatuses installed in one place.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 is a diagram illustrating object information according to the first embodiment;

DESCRIPTION OF EMBODIMENTS

First Embodiment

Hereinafter, with reference to the drawings, embodiments of the present disclosure will be described. Note that the same symbols are assigned to substantially the same components.

Figure 1:
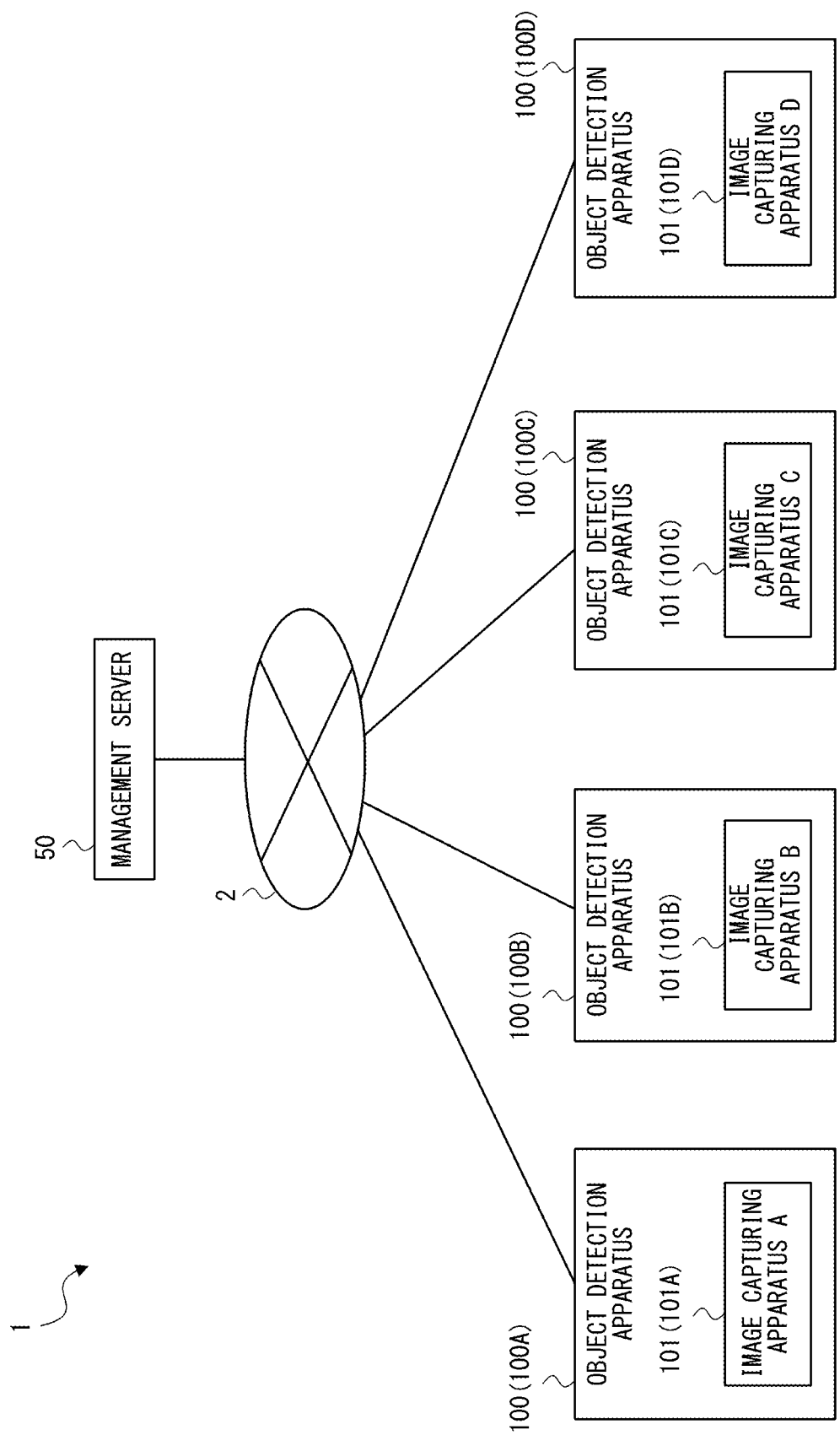
FIG. 1 is a diagram showing an object detection system according to a first embodiment.

FIG. 1 is a diagram showing an object detection system 1 according to a first embodiment. The object detection system 1 includes a management server 50 and plurality of object detection apparatuses 100 (100A-100D). The management server 50 and the plurality of object detection apparatuses 100 are connected to each other via a wired or wireless network 2 so that they can communicate with each other. Further, the plurality of object detection apparatuses 100A-100D may be connected to one another via the network 2 in such a way that they can communicate with one another.

The management server 50 is, for example, a computer. The management server 50 may be, for example, a cloud server. The management server 50 manages information generated in the object detection apparatuses 100 (object information, movement information etc. that will be described later). The management server 50 may include a database (DB) that stores this information.

The object detection apparatuses 100A-100D are arranged at positions different from one another. The object detection apparatuses 100A-100D are arranged, for example, near intersections of a road. Further, the object detection apparatuses 100A-100D may be arranged near the road at intervals of, for example, 50 m-100 m. The object detection apparatus 100 is, for example, an infrastructure sensor including a camera, a sensor or the like. The object detection apparatus 100 detects an object, in particular, a moving object, which is a movable object. FIG. 1 shows four object detection apparatuses 100A-100D. However, the number of object detection apparatuses 100 is not limited to four and may be any number equal to or larger than two.

Figure 2:
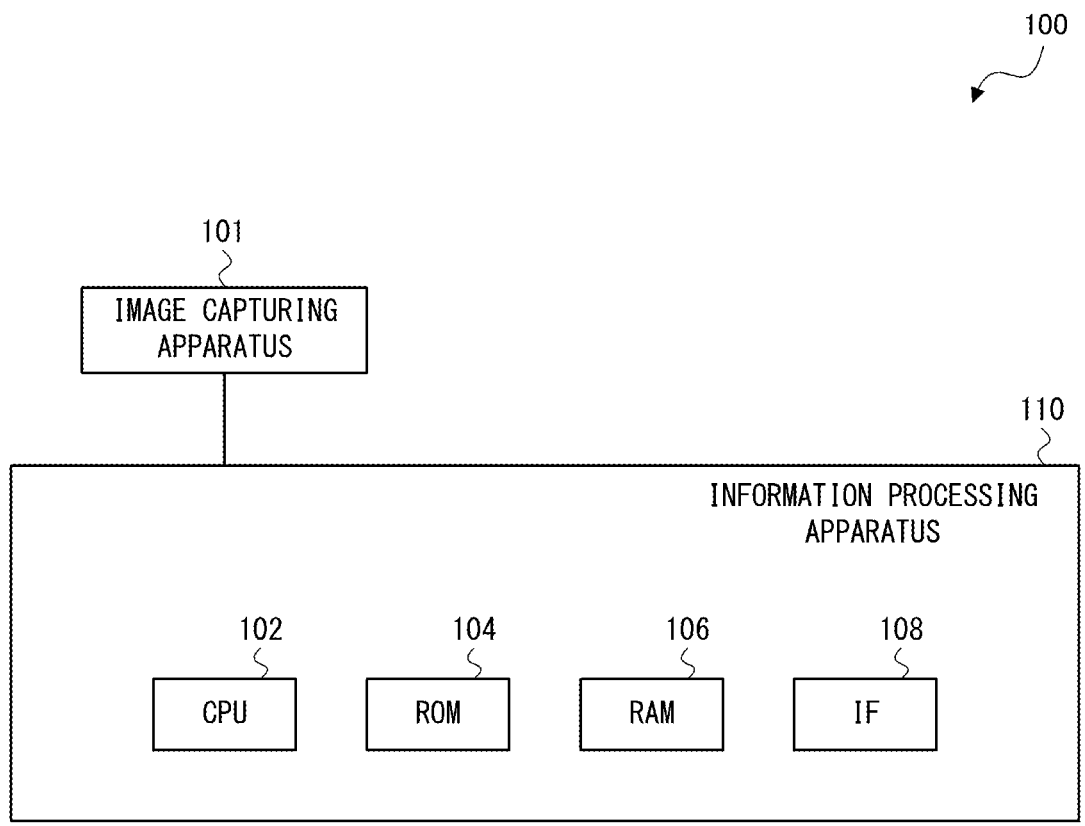
FIG. 2 is a diagram showing a hardware configuration of an object detection apparatus according to the first embodiment.

FIG. 2 is a diagram showing a hardware configuration of the object detection apparatus 100 according to the first embodiment. The object detection apparatus 100 includes an image capturing apparatus 101 and an information processing apparatus 110. That is, the object detection apparatuses 100A-100D respectively include image capturing apparatuses 101A-101D. The image capturing apparatus 101 may be physically separated from the information processing apparatus 110. In this case, the image capturing apparatus 101 is connected to the information processing apparatus 110 using a wire or wirelessly so that they can communicate with each other.

The image capturing apparatus 101 is, for example, a camera body. The image capturing apparatus 101 captures images of (photographs) a predetermined region (an imaging region) that corresponds to a position where the image capturing apparatus 101 (the object detection apparatus 100) is installed. The imaging region corresponds to an angle of view (a field of view; captured range) of the image capturing apparatus 101. The image capturing apparatus 101 can be regarded as an infrastructure sensor. The image capturing apparatus 101 may be a visible light camera, a three-dimensional camera (a point cloud camera) such as LiDAR (Light Detection and Ranging), or an infrared camera.

The information processing apparatus 110 performs object recognition processing on an image captured by the image capturing apparatus 101. Then the information processing apparatus 110 generates object information indicating a result of object recognition. The details thereof will be described later. In the following, the term "image" may also indicate "image data indicating an image", which indicates a target to be processed in information processing. Further, the image may be a still image or a moving image.

The information processing apparatus 110 includes, as a main hardware configuration, a Central Processing Unit (CPU) 102, a Read Only Memory (ROM) 104, a Random Access Memory (RAM) 106, and an interface unit 108 (IF; Interface). The CPU 102, the ROM 104, the RAM 106, and the interface unit 108 are connected to one another via a data bus or the like. The management server 50 may include a configuration that is substantially the same as the hardware configuration of the information processing apparatus 110 described above.

The CPU 102 has a function as an arithmetic apparatus that performs control processing, arithmetic processing and the like. The ROM 104 includes a function of storing a control program, an arithmetic program and the like executed by the CPU 102. The RAM 106 includes a function of temporarily storing process data and the like. The RAM 106 may include a database. Accordingly, the database may be implemented in the information processing apparatus 110. The interface unit 108 receives or outputs signals from or to an external device using a wire or wirelessly. Further, the interface unit 108 accepts an operation for inputting data performed by a user and displays information for the user.

Figure 3:
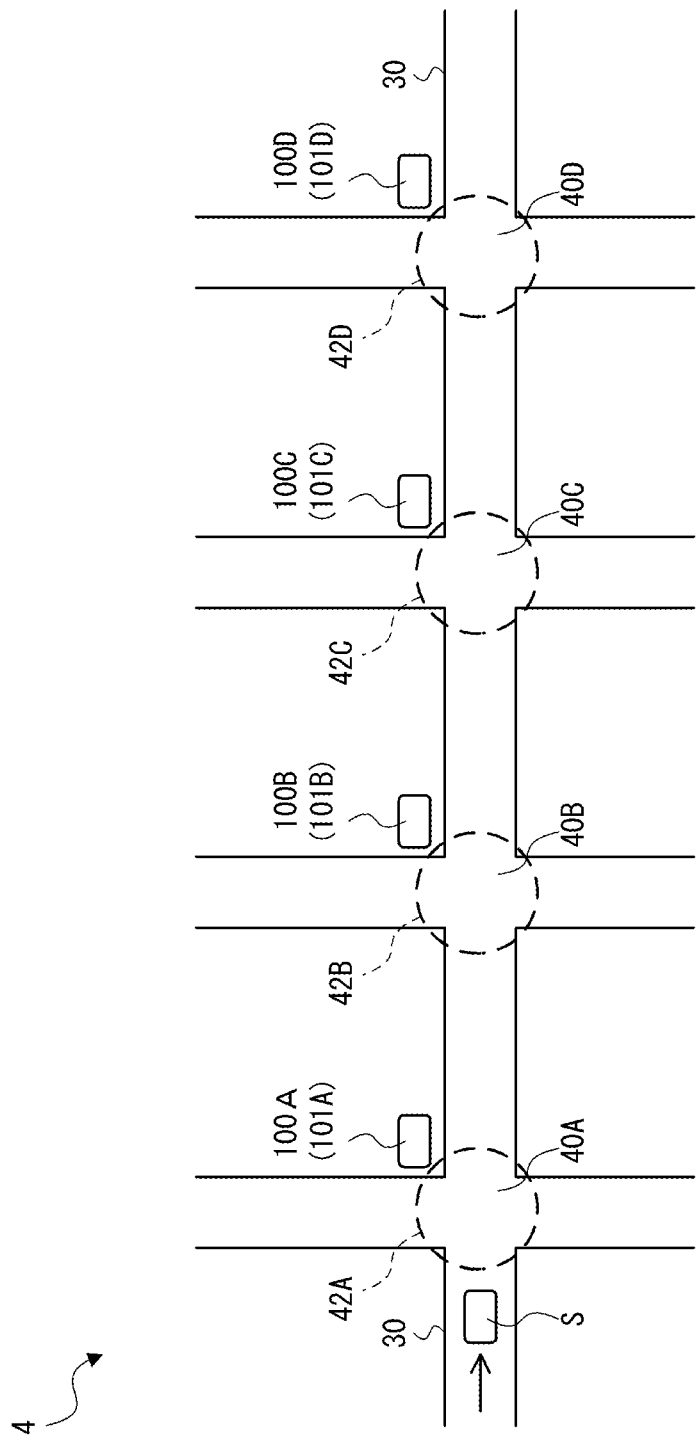
FIG. 3 is a diagram illustrating a state in which object detection apparatuses according to the first embodiment are installed in a road network.

FIG. 3 is a diagram illustrating a state in which the object detection apparatuses 100 according to the first embodiment are arranged in a road network 4. An outline of this embodiment will be described with reference to FIG. 3. The road network 4 includes a road 30. In the example shown in FIG. 3, the object detection apparatuses 100 (the image capturing apparatuses 101) are arranged near intersections 40. The image capturing apparatuses 101 of the object detection apparatuses 100 capture images of imaging regions 42 that correspond to the intersections 40. Then the information processing apparatuses 110 of the object detection apparatuses 100 detect (recognize) a moving object that is present in the imaging regions 42 using images captured by the image capturing apparatus 101. The information processing apparatuses 110 perform object recognition using, for example, a machine learning algorithm such as deep learning. The moving object, which is, for example, a vehicle, may be a pedestrian. The vehicle includes, for example, a bicycle, a motorcycle, an automobile, a bus, and a heavy truck.

For example, the object detection apparatus 100A (the image capturing apparatus 101A) is arranged, for example, near an intersection 40A. Then the image capturing apparatus 101A of the object detection apparatus 100A captures images of an imaging region 42A that corresponds to the intersection 40A. Then the object detection apparatus 100A detects (recognizes) a moving object that is present in the imaging region 42A using the images captured by the image capturing apparatus 101A.

Further, the object detection apparatus 100B (the image capturing apparatus 101B) is arranged near an intersection 40B that is adjacent to the intersection 40A. Then the image capturing apparatus 101B of the object detection apparatus 100B captures images of an imaging region 42B that corresponds to the intersection 40B. The object detection apparatus 100B then detects (recognizes) a moving object that is present in the imaging region 42B using the images captured by the image capturing apparatus 101B.

Further, the object detection apparatus 100C (the image capturing apparatus 101C) is arranged near an intersection 40C that is adjacent to the intersection 40B. Then the image capturing apparatus 101C of the object detection apparatus 100C captures images of an imaging region 42C that corresponds to the intersection 40C. Then the object detection apparatus 100C detects (recognizes) a moving object that is present in the imaging region 42C using the images captured by the image capturing apparatus 101C.

Further, the object detection apparatus 100D (the image capturing apparatus 101D) is arranged near an intersection 40D that is adjacent to the intersection 40C. Then the image capturing apparatus 101D of the object detection apparatus 100D captures images of an imaging region 42D corresponding to the intersection 40D. The object detection apparatus 100D then detects (recognizes) a moving object that is present in the imaging region 42D using the images captured by the image capturing apparatus 101D.

Assume, for example, that a moving object S moves along the road 30 in the order of the intersection 40A, the intersection 40B, the intersection 40C, and the intersection 40D. In this case, the moving object S first enters the intersection 40A, passes through the intersection 40A, and travels toward the intersection 40B. When the moving object S traveling toward the intersection 40A enters the imaging region 42A (an angle of view of the image capturing apparatus 101A), this moving object S is detected (recognized) by the object detection apparatus 100A. When the moving object S further moves and passes through the intersection 40A, the moving object S exits the imaging region 42A. In this case, the moving object S is no longer recognized by the object detection apparatus 100A.

When the moving object S further moves toward the intersection 40B from the intersection 40A, the moving object S enters the imaging region 42B from the direction of the intersection 40A. In this case, the moving object S is detected (recognized) by the object detection apparatus 100B. When the moving object S then exits the imaging region 42B, the moving object S is no longer recognized by the object detection apparatus 100B.

Likewise, when the moving object S moves toward the intersection 40C from the intersection 40B, the moving object S enters the imaging region 42C from the direction of the intersection 40B. In this case, the moving object S is detected (recognized) by the object detection apparatus 100C. When the moving object S exits the imaging region 42C, the moving object S is no longer recognized by the object detection apparatus 100C.

Likewise, when the moving object S further moves toward the intersection 40D from the intersection 40C, the moving object S enters the imaging region 42D from the direction of the intersection 40C. In this case, the moving object S is detected (recognized) by the object detection apparatus 100D. When the moving object S exits the imaging region 42D, the moving object S is no longer recognized by the object detection apparatus 100D.

Further, the information processing apparatus 110 of the object detection apparatus 100 generates object information, which is information regarding the recognized moving object. The object information may be generated every time the moving object is recognized. Therefore, during a period in which one moving object continues to be recognized by the object detection apparatus 100, a plurality of pieces of object information may be generated for this moving object. Then object information regarding one moving object is generated in each of the plurality of object detection apparatuses 100A-100D.

FIG. 4 is a diagram illustrating the object information according to the first embodiment. The object information includes, for example, an object ID, which is an identifier of the moving object, a type and reliability of the moving object, a recognition time, a recognition position (recognition latitude and recognition longitude), a recognition orientation, a recognition speed, and a feature amount. Further, when the moving object is a vehicle and can be recognized by the information processing apparatus 110, the object information may include the type of the vehicle, the color of the vehicle body, and the vehicle body number (number plate information).

The "recognition time" here indicates the time when object recognition processing has been performed for the corresponding moving object. The "recognition position" indicates the geographical position of the moving object when the object recognition processing has been performed. The "recognition position" may be calculated, for example, from the position of pixels that correspond to the moving object in the image captured by the image capturing apparatus 101. The recognition position may be calculated by, for example, associating a pixel position in an image captured by the image capturing apparatus 101 with a position on the road in advance. The "recognition orientation" indicates the moving direction (e.g., North, South, East, and West) of the moving object when the object recognition processing has been performed. The recognition orientation may be calculated by, for example, associating a direction in the image captured by the image capturing apparatus 101 with the orientation in advance and detecting in which direction on the image the moving object has moved. The "recognition speed" indicates the moving speed of the moving object when the object recognition processing has been performed. The recognition speed may be calculated, for example, by associating a pixel position in the image captured by the image capturing apparatus 101 with a position on the road in advance and calculating the difference between the positions of the moving object on the road per unit time.

Further, the "type" is a category (class) of the moving object determined in the object recognition processing. The type of the moving object is, for example, a heavy truck, a bus, an automobile, a motorcycle, a bicycle, or a pedestrian. Further, the "reliability" indicates the likelihood that the type of the moving object is likely to be correct (class probability; reliability score), which is determined in the object recognition processing. In the object information, the number of sets of the type and the reliability is not limited to one. For example, the type and the reliability may be expressed, for example, as "heavy truck: 0.3, bus: 0.7". The "feature amount" indicates features of the moving object extracted from the image captured by the image capturing apparatus 101. The feature amount may be extracted in the object recognition processing and may be used to determine the type of the object. Further, "the type of the vehicle" may be determined using, for example, a recognition dictionary in which the feature amount is associated with the type of the vehicle. Further, the vehicle body number may be extracted using, for example, Optical Character Recognition (OCR).

Further, when the moving object moves and exits the corresponding imaging region 42, the information processing apparatus 110 generates movement information (passage information) including object information generated just before the moving object exits the imaging region 42 and the installation position information regarding the position where the image capturing apparatus 101 is installed. Therefore, it can be said that the movement information is information regarding the moving object that has moved away from the imaging region 42. The movement information may be generated, for example, at predetermined time intervals.

Figure 5:
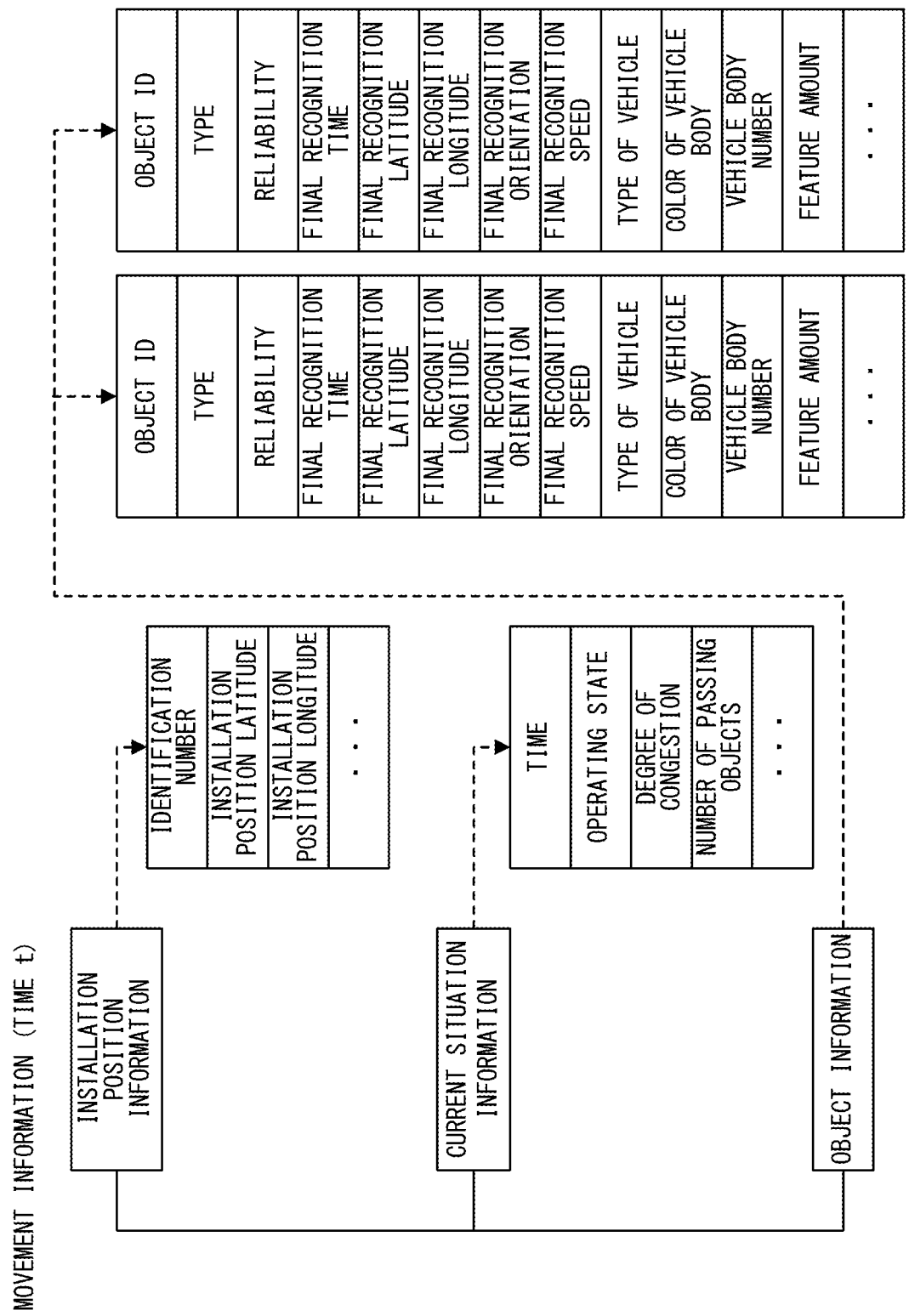
FIG. 5 is a diagram illustrating movement information according to the first embodiment.

FIG. 5 is a diagram illustrating the movement information according to the first embodiment. The movement information includes installation position information, current situation information, and object information. The installation position information is information regarding the place where the object detection apparatus 100 (the image capturing apparatus 101) is installed. In the example shown in FIG. 5, the installation position information is information regarding the intersection 40. When, for example, the object detection apparatus 100A generates the movement information, the installation position information is information regarding the intersection 40A. The installation position information includes, for example, the identification number of the intersection 40 and installation position information (installation position latitude and installation position longitude) indicating the position of the intersection 40. The identification number may be an identification number of the object detection apparatus 100 or the image capturing apparatus 101. Further, the installation position information may be positional information of the image capturing apparatus 101 or the imaging region 42.

The current situation information indicates the current situation in the intersection 40. When, for example, the object detection apparatus 100A generates movement information, the current situation information indicates the situation in the intersection 40A. The current situation information may indicate the current time, the operating state, the degree of congestion in the intersection 40, and the number of passing objects, which is the number of objects passing through the intersection 40.

The object information corresponds to the object information illustrated in FIG. 4. The object information included in the movement information relates to a moving object that is no longer recognized since it has exited the angle of view (the imaging region 42) of the image capturing apparatus 101. Specifically, the object information included in the movement information corresponds to the object information generated last before the corresponding moving object exits the angle of view (the imaging region 42) of the image capturing apparatus 101. In other words, the object information included in the movement information is object information generated just before the corresponding moving object exits the angle of view (the imaging region 42) of the image capturing apparatus 101. Therefore, the recognition time, the recognition position, the recognition orientation, and the recognition speed may be a final recognition time, a final recognition position, a final recognition orientation, and a final recognition speed, respectively.

The object detection apparatus 100 (the information processing apparatus 110) may transmit the generated movement information to an object detection apparatus 100 arranged near an intersection 40 adjacent to the intersection 40 corresponding to itself via the network 2. In this case, the object detection apparatus 100 arranged near the adjacent intersection 40 described above may acquire the movement information from the object detection apparatus 100. Further, the information processing apparatus 110 may store the generated movement information in a database of the management server 50 via the network 2. In this case, the object detection apparatus 100 arranged near the adjacent intersection 40 described above may acquire (receive) the movement information from the management server 50. That is, the object detection apparatus 100 (e.g., the object detection apparatus 100B) acquires movement information regarding the moving object included in an image (first image) captured by one image capturing apparatus 101 (e.g., the image capturing apparatus 101A; the first image capturing apparatus) among a plurality of image capturing apparatuses 101.

Then, the object detection apparatus 100 that has acquired the movement information determines a limited search range in an image (second image) captured by an image capturing apparatus 101 (second image capturing apparatus) among a plurality of image capturing apparatuses 101 in accordance with the above movement information. The object detection apparatus 100B that has acquired the movement information determines, for example, a limited search range in the image (second image) captured by the image capturing apparatus 101B (the second image capturing apparatus) in accordance with the above movement information. Then, this object detection apparatus 100 (e.g., the object detection apparatus 100B) performs object recognition of the moving object for the limited search range. Limiting the search range in the object recognition in this manner is referred to as a search limitation.

Assume, for example, that the moving object S passes through the intersection 40A and travels toward the intersection 40B. In this case, the object detection apparatus 100A generates object information regarding the moving object S when the moving object S is present in the imaging region 42A. When the moving object S exits from the imaging region 42A, the object detection apparatus 100A generates movement information regarding the moving object S. In this case, the object detection apparatus 100A may transmit the movement information to the adjacent object detection apparatus 100 (the object detection apparatus 100B and an object detection apparatus (not shown) which is opposite to the object detection apparatus 100B). Further, the object detection apparatus 100A may transmit the movement information to the management server 50.

On the other hand, the object detection apparatus 100B acquires the movement information generated by the object detection apparatus 100A from the object detection apparatus 100A or the management server 50. At this time, the object detection apparatus 100B estimates that the moving object S will reach the imaging region 42B from the direction of the intersection 40A (the imaging region 42A) at time tb. That is, the object detection apparatus 100B estimates the timing when the moving object S reaches the imaging region 42B from the direction of the intersection 40A (the imaging region 42A). At this time, the object detection apparatus 100B limits the search range of the moving object to a predetermined region in the direction of the intersection 40A in the image captured by the image capturing apparatus 101B, at time tb. In this manner, the object detection apparatus 100B determines a limited search range in the image (second image) captured by the image capturing apparatus 101B. Then, the object detection apparatus 100B performs object recognition of the moving object S in the limited search range, at time tb.

Figure 6:
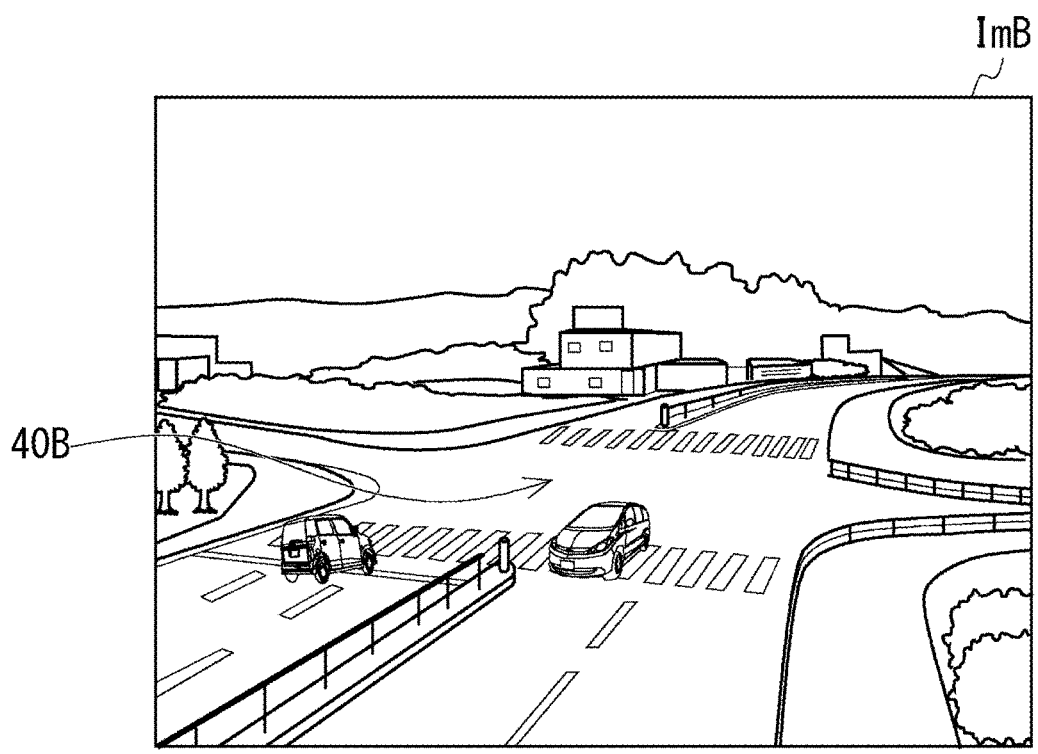
FIG. 6 is a diagram illustrating an image captured by an image capturing apparatus according to the first embodiment.
Figure 7:
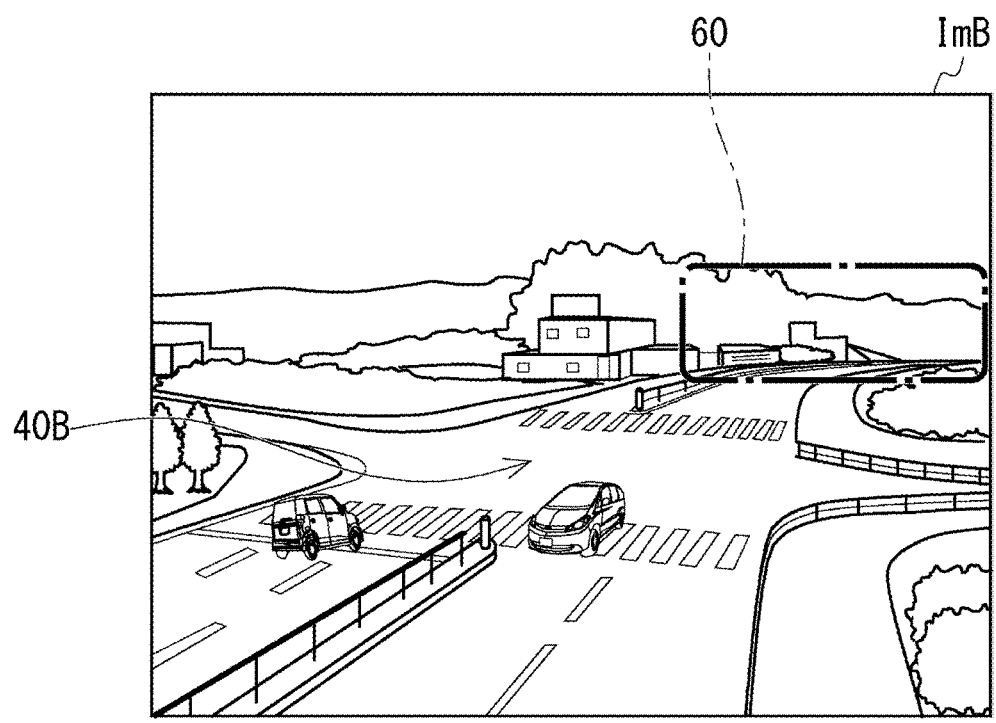
FIG. 7 is a diagram illustrating an image captured by the image capturing apparatus according to the first embodiment.

FIGS. 6 and 7 are diagrams each illustrating an image captured by the image capturing apparatus 101 according to the first embodiment. FIGS. 6 and 7 each illustrate an image ImB at the intersection 40B captured by the image capturing apparatus 101B. In the image ImB, the back side corresponds to the direction of the intersection 40A and the front side corresponds to the direction of the intersection 40C. Then the object detection apparatus 100B sets a limited search range 60 as illustrated in FIG. 7 when the moving object S reaches the angle of view (the imaging region 42B) of the image capturing apparatus 101B from the direction of the intersection 40A. Then the object detection apparatus 100B performs object recognition in the limited search range 60 illustrated in FIG. 7 at a timing when the moving object S appears in the angle of view (the imaging region 42B) of the image capturing apparatus 101B from the direction of the intersection 40A.

Now, effects of the object detection system 1 according to the first embodiment will be described along with the problem according to the above-described technique disclosed in Japanese Unexamined Patent Application Publication No. 2019-165501. When, for example, a moving object is recognized using a visible light camera, the object recognition is performed based on a feature amount of a pixel data group for each still image frame forming a video image in principle. Therefore, the higher the image quality becomes, the larger the range to be recognized becomes and the longer the processing time for each still image frame becomes. Further, due to characteristics of a visible light camera, the position and the size of the object on a projected still image frame vary greatly depending on the position of the object to be recognized (the distance or the angle from the camera). It is therefore difficult to improve the accuracy of recognition. When it is determined that the recognition degree (reliability score) is low in the object recognition, it is assumed that there is no object (missed recognitions).

In the aforementioned technique disclosed in Japanese Unexamined Patent Application Publication No. 2019-165501, when one target object is tracked by a plurality of cameras installed in one place, the result of the tracking in one of the plurality of cameras whose reliability is higher than those of the other ones is employed, thereby improving the accuracy of the tracking. Therefore, detection and tracking by a plurality of cameras need to be performed at substantially the same time, and the technique disclosed in Japanese Unexamined Patent Application Publication No. 2019-165501 cannot be applied to tracking of a moving object at different capturing times, that is, tracking of the moving object by cameras located away from one another. Therefore, in the technique disclosed in Japanese Unexamined Patent Application Publication No. 2019-165501, it is difficult to track an object over a wide range.

Further, when object recognition is performed using a video image, the number of images whose object needs to be recognized per unit time becomes enormous. Furthermore, as described above, when the search range (the size of this range) increases and the number of types of objects to be detected increases as the quality of the image becomes higher, the object recognition processing may become processing with an extremely heavy load.

On the other hand, when the moving object is tracked over a wide range, the object recognition processing is preferably performed by edge computers (or computers on a network aggregated to some extent) installed at places where cameras are installed in view of the problem of a network cost (load). By executing the object recognition processing in a large number of places, it is possible to grasp the movement state of the object or grasp the traffic volume over a wide range. While it is required to arrange a large number of edge computers in order to execute the object recognition processing in a large number of places, it is difficult to improve hardware specifications of each edge computer in view of the cost and the like. It is therefore required to reduce the amount of information to be processed and perform object recognition during an appropriate process time while preventing the accuracy of the object recognition from being reduced in the object recognition processing without improving the hardware specifications.

On the other hand, the object detection system 1 according to the first embodiment acquires movement information, which is information regarding the moving object included in, for example, the first image captured by the image capturing apparatus 101A (first image capturing apparatus) among the plurality of image capturing apparatuses 101 arranged in positions different from one another. Further, the object detection system 1 determines the limited search range in, for example, the second image captured by the image capturing apparatus 101B among the plurality of image capturing apparatuses 101 in accordance with the acquired movement information. Then the object detection system 1 performs recognition of the moving object for the limited search range in the second image. According to this configuration, the object detection system 1 according to the first embodiment detects a moving object only for a range where the moving object is highly likely to appear. Therefore, the detection speed becomes higher and the accuracy of the detection becomes higher than those in the case in which the whole image is searched. Further, since the plurality of image capturing apparatuses 101 are arranged at positions different from one another, a moving object can be detected over a wide range. Therefore, the object detection system 1 according to the first embodiment is able to track a moving object over a wide range, at a high processing speed, and with a high accuracy of recognition without increasing the number of image capturing apparatuses installed in one place.

Next, a configuration of the information processing apparatus 110 will be described.

Figure 8:
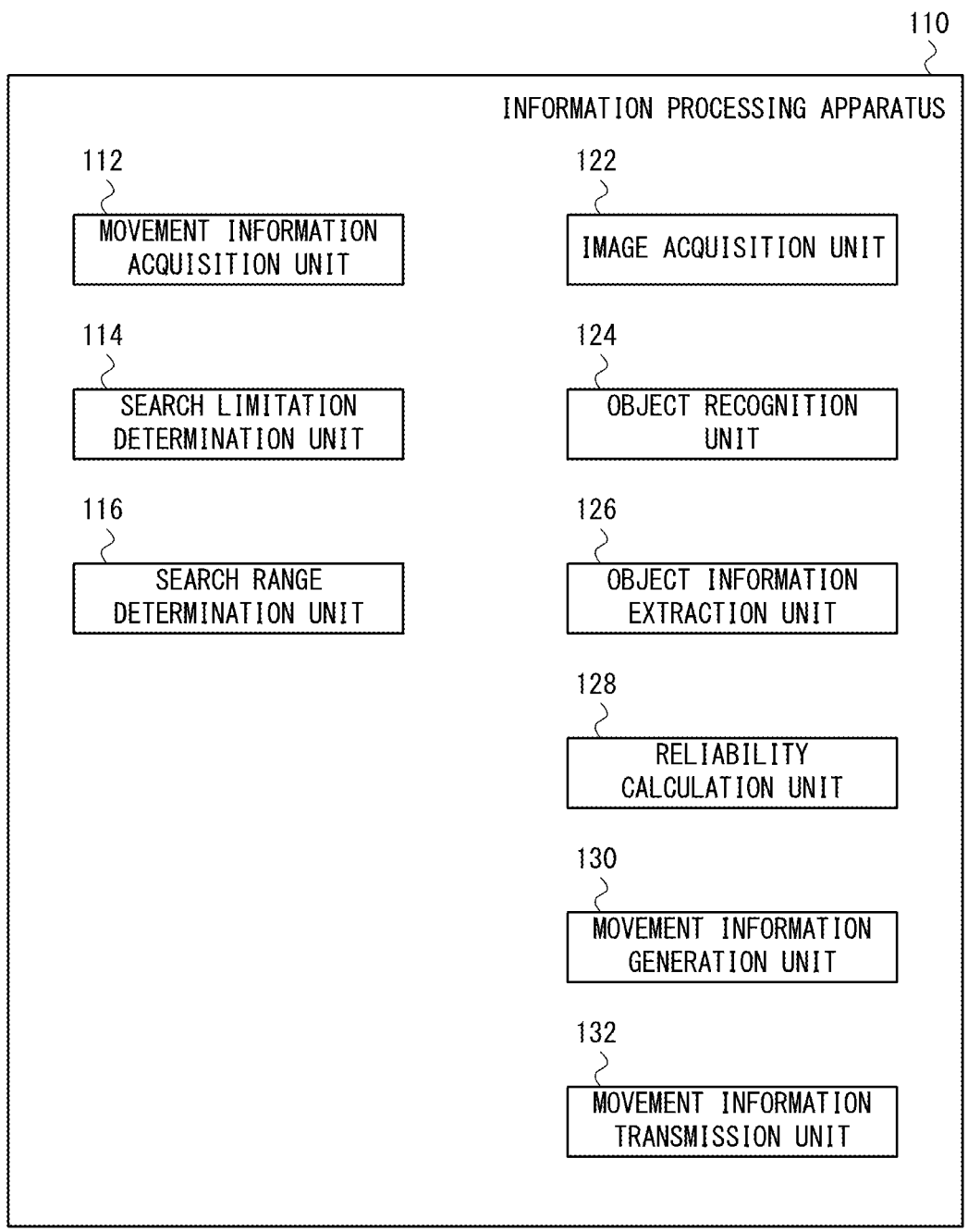
FIG. 8 is a block diagram showing a configuration of an information processing apparatus according to the first embodiment.

FIG. 8 is a block diagram showing a configuration of the information processing apparatus 110 according to the first embodiment. The information processing apparatus 110 includes a movement information acquisition unit 112, a search limitation determination unit 114, and a search range determination unit 116. Further, the information processing apparatus 110 includes an image acquisition unit 122, an object recognition unit 124, an object information extraction unit 126, a reliability calculation unit 128, a movement information generation unit 130, and a movement information transmission unit 132. These components may be implemented, for example, by the CPU 102 executing a program stored in the ROM 104. Further, a necessary program may be stored in an arbitrary non-volatile storage medium and installed as necessary, whereby each component may be implemented. Each component is not limited to be implemented by software as described above and may be implemented by hardware such as some sort of circuit element. Further, one or more of the above components may be implemented by physically separate hardware. For example, one or more of the above components may be provided by the management server 50.

In the following description of the components, the object detection apparatus 100 (the image capturing apparatus 101) that corresponds to the information processing apparatus 110 including each component (e.g., the movement information acquisition unit 112) may be simply referred to as an "own object detection apparatus 100 (own image capturing apparatus 101)". Further, the intersection 40 (the imaging region 42) that corresponds to the own object detection apparatus 100 may be simply referred to as "the corresponding intersection 40 (the corresponding imaging region 42)" or "own intersection 40 (own imaging region 42)". Further, an object detection apparatus 100 (the image capturing apparatus 101) that corresponds to an intersection 40 that is adjacent to the intersection 40 that corresponds to the own object detection apparatus 100 may be simply referred to as an "adjacent object detection apparatus 100 (adjacent image capturing apparatus 101)" or "object detection apparatus 100 (image capturing apparatus 101) adjacent to the own object detection apparatus 100". Further, the imaging region 42 (the intersection 40) that corresponds to the adjacent object detection apparatus 100 may be simply referred to as an "adjacent imaging region 42 (adjacent intersection 40)".

The movement information acquisition unit 112 is configured to acquire the aforementioned movement information. The movement information acquisition unit 112 may receive, for example, the movement information from an object detection apparatus 100 that corresponds to an intersection 40 that is adjacent to the intersection 40 that corresponds to the own object detection apparatus 100 via the network 2. In this case, the movement information acquisition unit 112 may store the acquired movement information in the database of the management server 50. Further, when the movement information is stored in the database of the management server 50, the movement information acquisition unit 112 may receive the movement information from the management server 50 via the network 2.

The movement information acquisition unit 112 may acquire, for example, at a timing when the movement information that corresponds to an intersection 40 that is adjacent to the intersection 40 that corresponds to the own object detection apparatus 100 has been generated, this movement information. When, for example, movement information generated in one object detection apparatus 100 has been transmitted from this object detection apparatus 100, the management server 50 may transmit the movement information to an object detection apparatus 100 that correspond to an intersection 40 that is adjacent to the intersection 40 that corresponds to the above movement information. Accordingly, the movement information acquisition unit 112 is able to acquire, at the timing when the movement information that corresponds to an intersection 40 that is adjacent to the intersection 40 that corresponds to the own object detection apparatus 100 has been generated, this movement information. Alternatively, the movement information acquisition unit 112 may acquire the movement information at predetermined intervals.

The search limitation determination unit 114 is configured to determine whether or not the acquired movement information indicates that the moving object is traveling toward the own imaging region 42. Then the search limitation determination unit 114 is configured to determine that a search limitation will be imposed when it is determined that the acquired movement information indicates that the moving object is traveling toward the own imaging region 42.

Specifically, the search limitation determination unit 114 determines whether or not object recognition will be performed in a limited search range in the own object detection apparatus 100. That is, the search limitation determination unit 114 determines whether or not a search limitation will be imposed when object recognition is performed in the future in the own object detection apparatus 100. Specifically, the search limitation determination unit 114 determines whether or not the moving object is traveling toward the intersection 40 (the imaging region 42) that corresponds to the own object detection apparatus 100 using the movement information generated in the adjacent object detection apparatus 100. For example, the search limitation determination unit 114 determines whether or not one moving object is traveling toward the intersection 40 that corresponds to the own object detection apparatus 100 from the final recognition orientation and the final recognition position (the final recognition latitude and the final recognition longitude) of the object information included in the movement information.

When it has been determined that one moving object is traveling toward the imaging region 42 that corresponds to the own object detection apparatus 100, the search limitation determination unit 114 estimates the timing when this moving object reaches the imaging region 42 that corresponds to the own object detection apparatus 100 (arrival time). Specifically, the search limitation determination unit 114 calculates the distance between the final recognition position of the object information included in the movement information and the position of the own imaging region 42. Then the search limitation determination unit 114 calculates the timing when the moving object reaches the imaging region 42 that corresponds to the own object detection apparatus 100 (arrival time) from the final recognition time and the final recognition speed of the object information included in the movement information. Specifically, the search limitation determination unit 114 calculates the time required to travel the calculated distance at the final recognition speed. Then the search limitation determination unit 114 adds the calculated time to the final recognition time, thereby calculating the timing when the moving object reaches the imaging region 42 that corresponds to the own object detection apparatus 100 (arrival time).

In this case, the search limitation determination unit 114 may determine that the moving object will appear in the own imaging region 42 at the estimated timing from the direction of the intersection 40 that corresponds to the object detection apparatus 100 that has generated the movement information. Then the search limitation determination unit 114 determines that a search limitation will be imposed at the estimated timing. Further, the search limitation may be performed for a predetermined period of time including the estimated timing. The search limitation determination unit 114 may store the result of the determination in the database of the management server 50. Alternatively, the search limitation determination unit 114 may store the result of the determination in the database implemented in the information processing apparatus 110.

The search range determination unit 116 is configured to determine the limited search range in the image captured by the image capturing apparatus 101 of the own object detection apparatus 100 in accordance with the acquired movement information. Specifically, the search range determination unit 116 determines the search range when the acquired movement information indicates that the moving object is traveling toward the own imaging region 42. More specifically, the search range determination unit 116 determines the limited search range in an image captured by the own object detection apparatus 100 (the image capturing apparatus 101) when the search limitation is imposed at the timing estimated by the search limitation determination unit 114. Then the search range determination unit 116 determines a predetermined range of the direction of the imaging region 42 of the adjacent object detection apparatus 100 that has generated the movement information in the image captured by the own image capturing apparatus 101 as a search range.

For example, like the limited search range 60 shown in FIG. 7, the search range determination unit 116 determines a predetermined region including at least a part of the road that leads to the adjacent imaging region 42 (the intersection 40) in the image captured by the own image capturing apparatus 101 to be a search range. The search range determination unit 116 may store the result of the determination (determined search range) in the database of the management server 50. Alternatively, the search range determination unit 116 may store the result of the determination (determined search range) in a database implemented by the information processing apparatus 110.

The image acquisition unit 122 is configured to acquire images from the image capturing apparatus 101. Specifically, the image acquisition unit 122 acquires images captured by the image capturing apparatus 101 of the own object detection apparatus 100. The acquisition of images may be executed for each timing when the image capturing apparatus 101 captures an image.

The object recognition unit 124 is configured to perform object recognition processing on the acquired image. Specifically, the object recognition unit 124 detects (recognizes) a moving object from the acquired image by, for example, a machine learning algorithm such as deep learning. The object recognition unit 124 extracts an object from the acquired image and calculates, for each extracted object, the type, the position, the speed, the direction in which it moves and the like. The object recognition unit 124 then generates object information (FIG. 4) using the result of the recognition. Then the object recognition unit 124 may transmit the generated object information to the management server 50, thereby storing this information in the database of the management server 50. Alternatively, the object recognition unit 124 may store the object information in a database implemented in the information processing apparatus 110.

At this stage, the object ID (FIG. 4) in the object information may be set arbitrarily. That is, even when a moving object recognized before as a result of object recognition performed by the adjacent object detection apparatus 100 is the same as the moving object recognized by the own object detection apparatus 100, an arbitrary object ID may be given.

When there is a search limitation, the object recognition unit 124 is configured to perform object recognition for the limited search range. Specifically, the object recognition unit 124 performs object recognition for the search range determined by the search range determination unit 116 at a timing of the search limitation estimated by the search limitation determination unit 114. When a search limitation is imposed, the movement information is generated after processing in the object information extraction unit 126 and the reliability calculation unit 128 that will be described later is performed. On the other hand, when there is no search limitation, the object recognition unit 124 is configured to perform object recognition for the whole image. When there is no search limitation, movement information is generated without performing processing in the object information extraction unit 126 and the reliability calculation unit 128 that will be described later. The object recognition unit 124 may determine whether or not there is a search limitation by accessing the database of the management server 50 or the database implemented in the information processing apparatus 110.

As described above, the object information extraction unit 126 performs processing when a search limitation is imposed. The object information extraction unit 126 is configured to extract object information regarding a moving object the same as the moving object recognized by the object recognition processing performed by the object recognition unit 124 from the database. Specifically, the object information extraction unit 126 extracts information on an object including a feature amount whose similarity to the feature amount of the recognized moving object is equal to or larger than a predetermined value as object information regarding a moving object the same as the moving object recognized by object recognition. That is, in this case, the object information extraction unit 126 determines a moving object whose feature amount is similar to that of the recognized moving object as a moving object the same as the recognized moving object. Alternatively, when the type of the vehicle, the color of the vehicle body, and the vehicle body number are included in the object information, the object information extraction unit 126 may extract object information where these information (the type of the vehicle, etc.) coincide with that included in object information regarding the recognized moving object. Note that the object information extraction unit 126 may rewrite the object ID of the object information generated for the recognized moving object into an object ID of the extracted object information. Accordingly, one object ID may be associated with the object information of one moving object.

When a search limitation is imposed, it is highly likely that the moving object recognized in the limited search range has been also recognized by an adjacent object detection apparatus 100. Therefore, it is highly likely that object information regarding a moving object the same as the above moving object has already been stored in a database. On the other hand, when a search limitation is not imposed, it is possible that a moving object that is the same as the recognized moving object may not have been recognized by the adjacent object detection apparatus 100. Therefore, the object information regarding a moving object the same as the above moving object may not be stored in the database. Therefore, when there is search limitation, the object information extraction unit 126 extracts object information regarding a moving object the same as the recognized moving object from the database. The object information extraction unit 126 may perform the aforementioned processing even when a search limitation is not imposed. However, as described above, since it is possible that object information regarding a moving object the same as the recognized moving object may not be stored in a database, an enormous amount of time may be required to perform extraction processing. That is, it may take time before it is determined that object information regarding a moving object the same as the recognized moving object is not stored in a database.

As described above, the reliability calculation unit 128 performs processing when a search limitation is imposed. The reliability calculation unit 128 is configured to re-calculate the reliability of the type of the recognized moving object using the object information extracted by the object information extraction unit 126. Specifically, the reliability calculation unit 128 re-calculates, for each recognized moving object, the reliability of the type of the moving object using the reliability in object information of a moving object determined to be the same as the above moving object and the reliability in object information regarding the recognized moving object. In other words, the reliability calculation unit 128 updates the reliability regarding the recognized moving object using the reliability regarding a moving object determined to be the same. In other words, the reliability calculation unit 128 calculates the reliability of the recognition of the moving object for each type using the type and the reliability of the moving object obtained as a result of object recognition performed by the object recognition unit 124 and the type and the reliability of the moving object included in the acquired movement information.

More specifically, the reliability calculation unit 128 re-calculates the reliability of the moving object S using the reliability of the type obtained by the own object detection apparatus 100 and the reliability of the type obtained by the adjacent object detection apparatus 100. This re-calculated reliability is called an "integrated reliability". It is assumed, for example, regarding the moving object S, that the object information generated by the adjacent object detection apparatus 100 indicates that the reliability of a type A1 (e.g., the "heavy truck") is Ba1 and the reliability of a type A2 (e.g., the "bus") is Ba2. It is further assumed that the object information generated by the own object detection apparatus 100 indicates that the reliability of the type A1 is Bb1 and the reliability of the type A2 is Bb2. In this case, the reliability calculation unit 128 calculates, regarding the type A1, the integrated reliability by calculating the average of the reliability Ba1 and the reliability Bb1. Likewise, the reliability calculation unit 128 calculates, regarding the type A2, the integrated reliability by calculating the average of the reliability Ba2 and the reliability Bb2. For example, the reliability calculation unit 128 may calculate the updated reliability (integrated reliability) by calculating, for each type, the (weighted) harmonic mean of reliabilities. In the above example, the reliability calculation unit 128 calculates, regarding the type A1, the integrated reliability by calculating the weighted harmonic mean of the reliability Ba1 and the reliability Bb1. Likewise, the reliability calculation unit 128 calculates, regarding the type A2, the integrated reliability by calculating the weighted harmonic mean of the reliability Ba2 and the reliability Bb2.

The movement information generation unit 130 is configured to generate movement information (FIG. 5) including object information regarding a moving object that is no longer recognized. Specifically, the movement information generation unit 130 generates movement information including object information regarding a moving object that is no longer recognized by the object recognition unit 124 since it has exited the own intersection 40 (the imaging region 42) among all the moving objects that have already been recognized. Note that the movement information generation unit 130 may generate movement information at predetermined time intervals.

For example, the movement information generation unit 130 extracts, for each object ID, the latest object information among those whose "recognition time" is earlier than the current time by a predetermined period of time or more from the database. Accordingly, the movement information generation unit 130 is able to extract the latest object information regarding a moving object that has exited the own imaging region 42. Then the movement information generation unit 130 sets this extracted object information as "object information" in the movement information shown in FIG. 5. The movement information generation unit 130 further generates installation position information regarding the own object detection apparatus 100 and the current situation information. Accordingly, the movement information generation unit 130 generates the movement information. Note that the movement information generation unit 130 may store the movement information in the database implemented in the information processing apparatus 110.

The movement information transmission unit 132 is configured to transmit the movement information generated by the movement information generation unit 130. The movement information acquisition unit 112 may transmit the movement information to the management server 50 via the network 2, thereby storing the movement information in the database of the management server 50. Further, the movement information transmission unit 132 may transmit the movement information to an object detection apparatus 100 adjacent to the own object detection apparatus 100 via the network 2. In this case, the movement information transmission unit 132 may transmit the movement information to an object detection apparatus 100 that corresponds to an intersection 40 which is in the direction in which the moving object travels (final recognition orientation).

Figure 9:
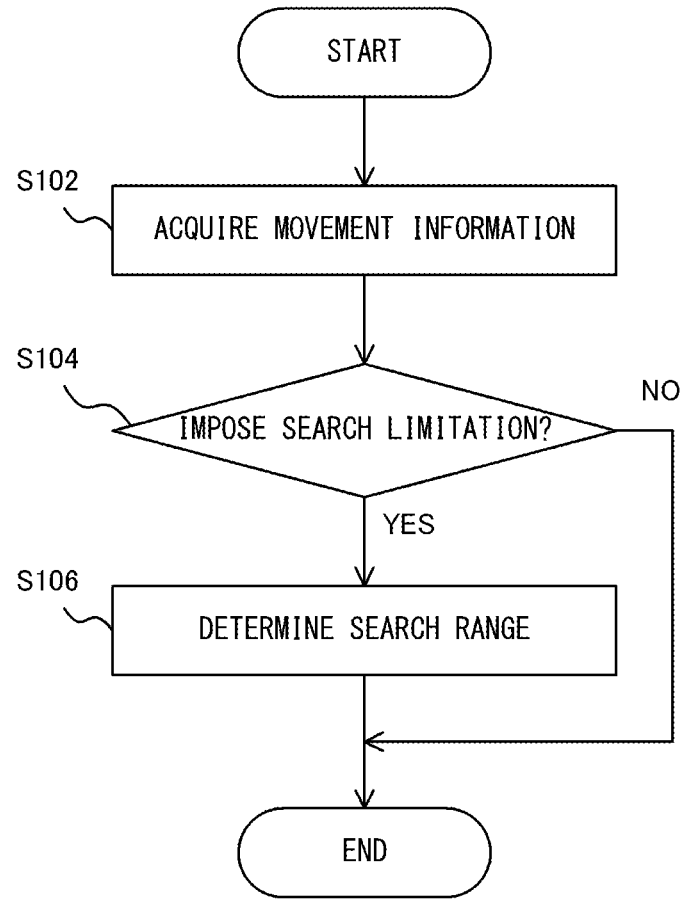
FIG. 9 is a flowchart showing an object detection method executed by an object detection system according to the first embodiment.
Figure 10:
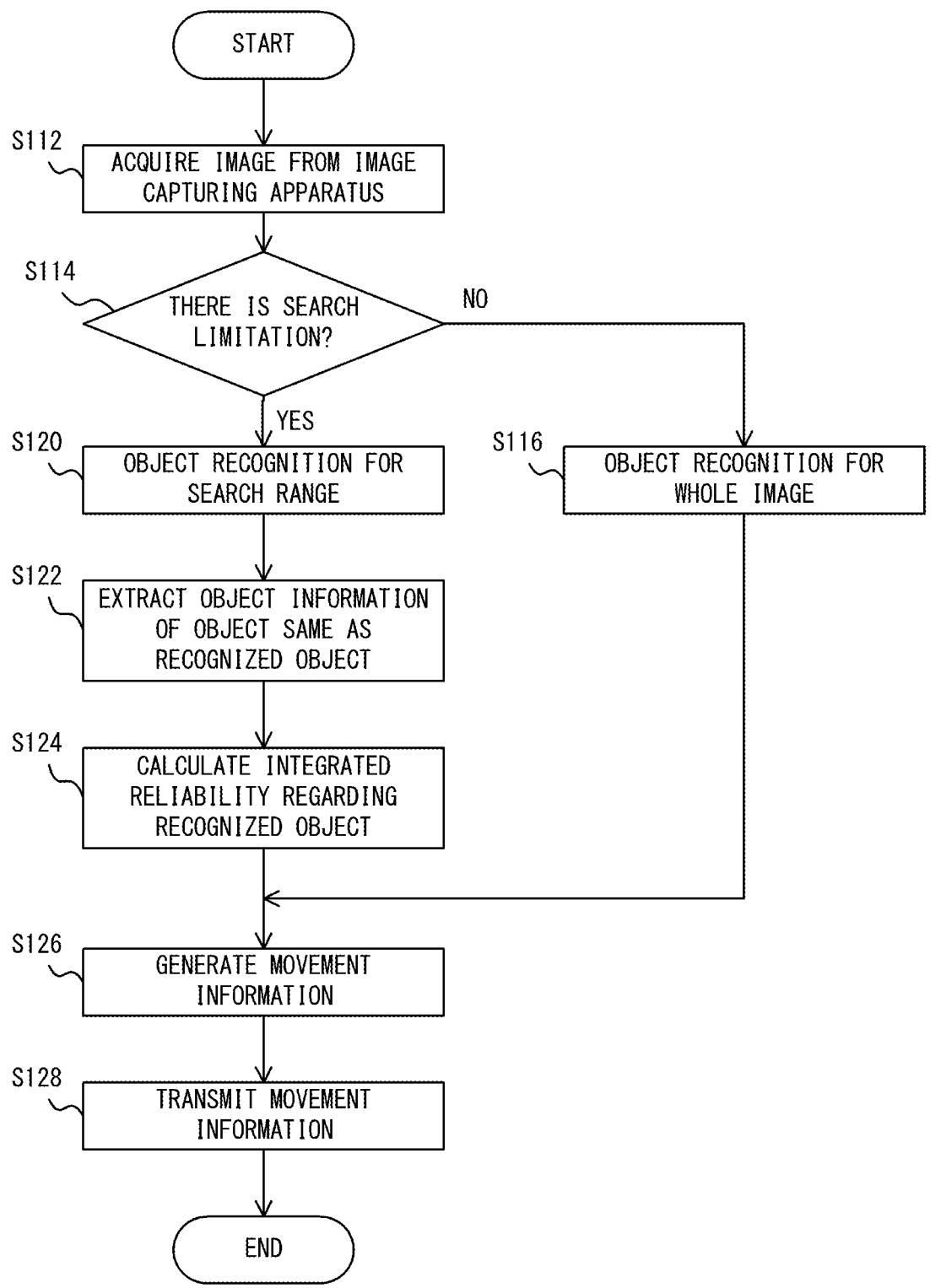
FIG. 10 is a flowchart showing an object detection method executed by the object detection system according to the first embodiment.

FIGS. 9 and 10 are flowcharts each showing the object detection method executed by the object detection system 1 according to the first embodiment. The processing shown in FIG. 9 may be executed, for example, at predetermined time intervals. As described above, the movement information acquisition unit 112 acquires the movement information (Step S102). Specifically, the movement information acquisition unit 112 acquires movement information regarding a moving object included in the image (first image) captured by the adjacent image capturing apparatus 101 (the first image capturing apparatus).

As described above, the search limitation determination unit 114 determines whether or not to impose a search limitation when object recognition is performed in the future by the own object detection apparatus 100 using the movement information (Step S104). That is, the search limitation determination unit 114 determines whether or not the moving object regarding the movement information is traveling toward the own imaging region 42. At this time, as described above, the search limitation determination unit 114 determines the timing when a search limitation is imposed. Then the search limitation determination unit 114 stores the result of the determination in the database.

When it is determined that the moving object regarding the movement information is not traveling toward the own imaging region 42, the search limitation determination unit 114 determines that a search limitation will not be imposed (NO in S104). In this case, the subsequent processing S106 is omitted. On the other hand, when it is determined that the moving object regarding the movement information is traveling toward the own imaging region 42, the search limitation determination unit 114 determines that a search limitation will be imposed (YES in S104). In this case, as described above, the search range determination unit 116 determines the limited search range in the image captured by the image capturing apparatus 101 of the own object detection apparatus 100 in accordance with the acquired movement information (Step S106). Then the search range determination unit 116 stores the determined search range in the database.

In other words, the search range determination unit 116 determines the search range when the movement information indicates that the moving object is traveling toward the own imaging region 42 (imaging region of the second image capturing apparatus). Accordingly, the search range may be limited when the moving object appears in the own imaging region 42. Therefore, it is possible to detect a moving object more definitely in a determined search range.

Further, as described above, the search range determination unit 116 determines a predetermined range in the direction of the imaging region 42 of the adjacent image capturing apparatus 101 (the first image capturing apparatus) in the image captured by the own image capturing apparatus 101 (the second image) to be a search range. Accordingly, a range where a moving object is highly likely to appear in the angle of view of the image capturing apparatus 101 is determined to be a search range. Therefore, it is possible to determine the search range more appropriately.

The processing shown in FIG. 10 may be executed, for example, every time the own image capturing apparatus 101 captures an image. As described above, the image acquisition unit 122 acquires an image from the own image capturing apparatus 101 (Step S112). The object recognition unit 124 determines whether or not there is a search limitation (Step S114). Specifically, the object recognition unit 124 accesses the database to determine, regarding the own object detection apparatus 100 (the imaging region 42), whether or not a result of the determination indicating that a search limitation will be imposed at the current timing is stored.

When it has been determined that there is no search limitation at the current timing (NO in S114), the object recognition unit 124 performs object recognition without imposing a search limitation. Therefore, the object recognition unit 124 performs object recognition for the whole image acquired in S112 (Step S116). Then the object recognition unit 124 generates object information, as described above. Then the object recognition unit 124 stores the generated object information in a database.

On the other hand, when it is determined that there is a search limitation at the current timing (YES in S114), the object recognition unit 124 performs object recognition with imposing a search limitation. That is, the object recognition unit 124 extracts a search range from the database and performs object recognition for the extracted search range (Step S120). Then the object recognition unit 124 generates the object information, as described above. Then the object recognition unit 124 stores the generated object information in the database.

As described above, at a timing when the moving object is estimated to reach the own imaging region 42 (the imaging region of the second image capturing apparatus), the object recognition unit 124 performs object recognition of the moving object on the search range. Accordingly, at the timing when the moving object is estimated to reach the own imaging region 42, the search range is limited. It is therefore possible to detect a moving object more definitely.

As described above, the object information extraction unit 126 extracts object information regarding a moving object that is the same as the moving object recognized by the object recognition processing performed by the object recognition unit 124 from the database (Step S122). Then the reliability calculation unit 128 calculates the integrated reliability regarding the recognized moving object using the object information extracted by the object information extraction unit 126, as described above (Step S124). Specifically, the reliability calculation unit 128 calculates, for each type, the reliability (integrated reliability) of the moving object using the type and the reliability of the moving object obtained as a result of object recognition performed by the object recognition unit 124 and the type and the reliability of the moving object included in the movement information.

As described above, the reliability calculation unit 128 re-calculates (updates) a reliability, whereby the accuracy of the reliability can be improved. That is, the amount of data regarding the reliability calculated using a plurality of pieces of object information is larger than that in the reliability obtained in the object recognition processing performed by the object recognition unit 124. Therefore, the accuracy of the reliability calculated using the plurality of pieces of object information may become higher than the accuracy of the reliability obtained in the object recognition processing performed by the object recognition unit 124.

Further, the reliability calculation unit 128 is configured to calculate the reliability (integrated reliability) by calculating, for each type, the average of the reliability of the moving object obtained as a result of object recognition performed by the object recognition unit 124 and the reliability of the moving object included in the movement information. Accordingly, a reliability in which a plurality of reliabilities are taken into account is calculated for each determined type of the moving object. Therefore, the reliability calculation unit 128 is able to calculate the integrated reliability more appropriately.

As described above, the movement information generation unit 130 generates movement information (Step S126). When the integrated reliability has been calculated in S124, the movement information generation unit 130 generates the movement information in such a way that the reliability of the corresponding moving object in the object information becomes the integrated reliability. The movement information transmission unit 132 transmits the movement information generated in the processing of S126 (Step S128). In this case, as described above, the movement information acquisition unit 112 may store the movement information in the database of the management server 50. Further, the movement information transmission unit 132 may transmit the movement information to the adjacent object detection apparatus 100.

Figure 11:
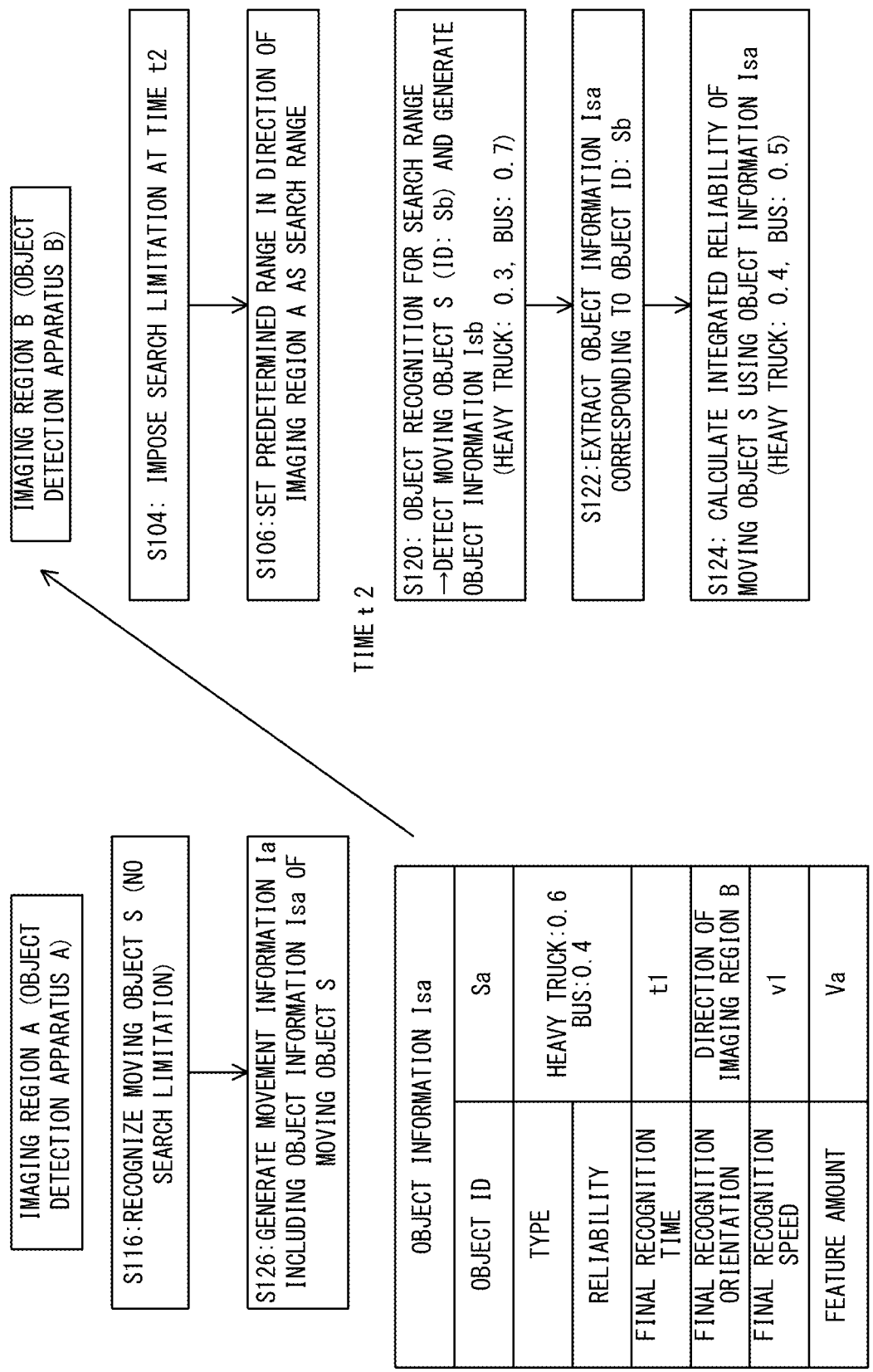
FIG. 11 is a diagram for describing a specific example of processing of the object detection system according to the first embodiment.

FIG. 11 is a diagram for describing a specific example of processing in the object detection system 1 according to the first embodiment. FIG. 11 illustrates processing in a case in which the moving object S moves from the imaging region 42A to the imaging region 42B, as illustrated in FIG. 3. It is assumed that the moving object S has been recognized for the first time in the object detection apparatus 100A.

Since the moving object S is recognized for the first time in the object detection apparatus 100A, at this stage, no object detection apparatus 100 generates movement information including object information regarding the moving object S. Therefore, the object recognition unit 124 of the object detection apparatus 100A performs object recognition processing on the whole image captured by the image capturing apparatus 101A without performing a search limitation, thereby recognizing the moving object S (S116).

Then, the movement information generation unit 130 of the object detection apparatus 100A generates movement information Ia including object information Isa of the moving object S (S126). It is assumed that the object ID of the moving object S is Sa in the object information Isa. It is further assumed that the final recognition time of the moving object S is t1 in the object information Isa. It is further assumed that the final recognition orientation of the moving object S is "a direction of the imaging region B". Further, the final recognition speed of the moving object S is denoted by v1. Further, the feature amount of the moving object S is denoted by Va.

Further, it is assumed that the type and the reliability of the moving object S are "heavy truck: 0.6" and "bus: 0.4". Therefore, in the result of the recognition by the object detection apparatus 100A, the reliability of the type (category) of the moving object S is higher in "heavy truck" than that in "bus". That is, in the result of the recognition by the object detection apparatus 100A, the moving object S is highly likely to be a "heavy truck".

On the other hand, the object detection apparatus 100B that corresponds to the imaging region 42B toward which the moving object S travels acquires the movement information Isa. Then the search limitation determination unit 114 of the object detection apparatus 100B determines that the moving object S is traveling toward the imaging region 42B from the final recognition orientation of the moving object S "the direction of the imaging region B". Then the search limitation determination unit 114 of the object detection apparatus 100B estimates, from the final recognition time t1 and the final recognition speed v1 of the moving object S, that the moving object S will reach the imaging region 42B at time t2. That is, the search limitation determination unit 114 of the object detection apparatus 100B determines that the moving object appears in the angle of view of the image capturing apparatus 101B at time t2. Therefore, the search limitation determination unit 114 of the object detection apparatus 100B determines that a search limitation will be imposed at time t2 (S104). Then, the search range determination unit 116 of the object detection apparatus 100B sets a predetermined range in the direction of the imaging region 42A as a limited search range 60, as illustrated in FIG. 7 (S106).

When the image captured by the image capturing apparatus 101B is acquired at time t2, the object recognition unit 124 of the object detection apparatus 100B performs object recognition for the limited search range (S120). Then the object recognition unit 124 of the object detection apparatus 100B detects the moving object S and generates the object information Isb regarding the moving object S.

It is assumed, in the object information Isb, that the object ID of the moving object S is Sb. It is further assumed that the type and the reliability of the moving object S are "heavy truck: 0.3" and "bus: 0.7". Therefore, in the result of the recognition by the object detection apparatus 100B, the reliability of the type (category) of the moving object S is higher in "bus" than that in "heavy truck". That is, in the result of the recognition by the object detection apparatus 100B, the moving object S is highly likely to be a "bus". In this way, the result of the recognition by the object detection apparatus 100B may be different from the result of the recognition by the object detection apparatus 100A. This is because the accuracy of the recognition may vary depending on an environmental factor such as the position where the image capturing apparatus 101 is installed with respect to the intersection 40, visibility at the intersection 40, brightness in the intersection 40 depending on weather or the like, and the performance of the image capturing apparatus 101.

Further, the object information extraction unit 126 of the object detection apparatus 100B determines that the feature amount Va in the object information Isa is similar to the feature amount of the moving object S obtained in the object recognition processing in S120. Therefore, the object information extraction unit 126 of the object detection apparatus 100B extracts the object information Isa that corresponds to the moving object S (object ID: Sb) (S122).

Then the reliability calculation unit 128 of the object detection apparatus 100B calculates the integrated reliability of the moving object S using the extracted object information Isa (S124). In this case, the reliability calculation unit 128 of the object detection apparatus 100B calculates, regarding the type "heavy truck", that a harmonic mean of the reliability "0.6" in the object information Isa and the reliability "0.3" in the object information Isb is "0.4". The reliability calculation unit 128 of the object detection apparatus 100B further calculates, regarding the type "bus", that a harmonic mean of the reliability "0.4" in the object information Isa and the reliability "0.7" in the object information Isb is "0.5".

As described above, the accuracy of the recognition may vary depending on an environmental factor regarding the image capturing apparatus 101. Therefore, a result of the recognition by one object detection apparatus 100 is not always correct. As described above, in the example shown in FIG. 11, in the result of the recognition by the object detection apparatus 100A, the moving object S is highly likely to be a "heavy truck", whereas in the result of the recognition by the object detection apparatus 100B, the moving object S is highly likely to be a "bus". On the other hand, according to this embodiment, the accuracy of the reliability can be increased by calculating the integrated reliability using the reliability in the plurality of pieces of object information.

Further, when the moving object S moves in the imaging region 42C and the imaging region 42D, object recognition is performed regarding the moving object S in both the object detection apparatus 100C and the object detection apparatus 100D. Therefore, in both the object detection apparatus 100C and the object detection apparatus 100D, data of the reliability regarding the moving object S is further obtained. Therefore, by calculating the integrated reliability further using the reliability obtained in object recognition by the object detection apparatus 100C and the object detection apparatus 100D, the accuracy of recognition regarding the moving object S can be further increased. That is, when the integrated reliability is calculated using a large amount of data regarding reliability, a value of the integrated reliability regarding the correct type of the moving object S may tend to become large. Therefore, according to this embodiment, the larger the number of intersections 40 (the imaging regions 42) that the moving object S passes through becomes, the higher the accuracy of recognition of the moving object S becomes. It is therefore possible to prevent the moving object from being falsely recognized. For example, in the object recognition by the object detection apparatus 100A, the moving object S, which is actually a bus, may be falsely recognized to be a heavy truck. On the other hand, by calculating the integrated reliability, the reliability (the integrated reliability) of the bus may become high, whereby it is possible to prevent the moving object S from being falsely recognized as a heavy truck.

MODIFIED EXAMPLES

Note that the present disclosure is not limited to the above-described embodiments and may be changed as appropriate without departing from the spirit of the present disclosure. For example, the order of each step in the flowcharts shown in FIGS. 9 and 10 can be changed as appropriate. Further, one or more steps of the flowcharts shown in FIGS. 9 and 10 may be omitted. For example, in FIG. 10, the processing of S122 and S124 may be omitted.

Further, while the object detection method shown in FIGS. 9 and 10 is executed in the information processing apparatus 110 of the object detection apparatus 100 in the above-described embodiment, this configuration is merely an example. For example, one or more of the processes shown in FIGS. 9 and 10 may be executed by the management server 50. For example, the processing of FIG. 9 may be executed by the management server 50. Further, all the processes in FIGS. 9 and 10 may be executed by the management server 50. In this case, the management server 50 may receive images captured by the image capturing apparatus 101 from each of the object detection apparatuses 100 and perform the aforementioned processing for each of the object detection apparatuses 100. However, if all the processes are executed in the management server 50, it is possible that communication loads may increase. Therefore, some of the processes in the object detection method may be preferably executed by the object detection apparatus 100. For example, the processing regarding the object recognition may be preferably executed in the object detection apparatus 100.

Further, while the object recognition unit 124 detects an arbitrary moving object, this configuration is merely an example. The object recognition unit 124 may recognize only a specific moving object such as a vehicle violating traffic regulations. Further, the image capturing apparatus 101 may not be fixed near the intersection 40. For example, images of the intersection 40 may be captured by an image capturing apparatus 101 mounted on a drone or the like.

Further, in the above-described examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An object detection system comprising:
a central processing unit (CPU) configured to:
acquire movement information, which is information regarding a moving object included in a first image captured by a first image capturing apparatus among a plurality of image capturing apparatuses arranged in positions different from one another;
determine a limited search range in a second image captured by a second image capturing apparatus among the plurality of image capturing apparatuses in accordance with the movement information;

perform recognition of the moving object for the limited search range in the second image; and calculate, for each type of the moving object, a reliability of recognition of the moving object using a type and a reliability of the moving object obtained as a result of performing recognition of the moving object and a type and a reliability of the moving object included in the movement information, wherein the reliability is calculated by calculating an average of the reliability of the moving object obtained as a result of performing recognition of the moving object and the reliability of the moving object included in the movement information.

2. The object detection system according to claim 1, wherein the CPU is configured to determine the limited search range when the movement information indicates that the moving object is traveling toward an imaging region of the second image capturing apparatus.

3. The object detection system according to claim 2, wherein the CPU is configured to determine a predetermined range in the second image that corresponds to a direction of an imaging region of the first image capturing apparatus to be the limited search range.

4. The object detection system according to claim 1, wherein the CPU is configured to perform recognition of the moving object for the limited search range at a timing when the moving object is estimated to reach an imaging region of the second image capturing apparatus.

5. The object detection system according to claim 1, further comprising the plurality of image capturing apparatuses.

6. An object detection method comprising:

acquiring movement information, which is information regarding a moving object included in a first image captured by a first image capturing apparatus among a plurality of image capturing apparatuses arranged in positions different from one another;

determining a limited search range in a second image captured by a second image capturing apparatus among the plurality of image capturing apparatuses in accordance with the movement information;

performing recognition of the moving object for the limited search range in the second image; and calculating, for each type of the moving object, a reliability of recognition of the moving object using a type and a reliability of the moving object obtained as a result of performing recognition of the moving object and a type and a reliability of the moving object included in the movement information, wherein the reliability is calculated by calculating an average of the reliability of the moving object obtained as a result of performing recognition of the moving object and the reliability of the moving object included in the movement information.

7. A non-transitory computer readable medium storing a program for causing a computer to execute:

acquiring movement information, which is information regarding a moving object included in a first image captured by a first image capturing apparatus among a plurality of image capturing apparatuses arranged in positions different from one another;

determining a limited search range in a second image captured by a second image capturing apparatus among the plurality of image capturing apparatuses in accordance with the movement information;

performing recognition of the moving object for the limited search range in the second image; and calculating, for each type of the moving object, a reliability of recognition of the moving object using a type and a reliability of the moving object obtained as a result of performing recognition of the moving object and a type and a reliability of the moving object included in the movement information, wherein the reliability is calculated by calculating an average of the reliability of the moving object obtained as a result of performing recognition of the moving object and the reliability of the moving object included in the movement information.

* * * * *